US012623449B2

(12) United States Patent
Adams et al.

(10) Patent No.: US 12,623,449 B2
(45) Date of Patent: May 12, 2026

(54) COMPOSITE BACKING LAYER PEEL STARTER

(71) Applicant: The Boeing Company, Arlington, VA (US)

(72) Inventors: Travis Adams, Villa Ridge, MO (US); Adam David Martinez, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 32 days.

(21) Appl. No.: 18/490,558

(22) Filed: Oct. 19, 2023

(65) Prior Publication Data

US 2025/0128509 A1     Apr. 24, 2025

(51) Int. Cl.
*B32B 43/00* (2006.01)

(52) U.S. Cl.
CPC ....... *B32B 43/006* (2013.01); *Y10T 156/1132* (2015.01); *Y10T 156/1944* (2015.01)

(58) Field of Classification Search
CPC ............. B32B 43/006; Y10T 156/1132; Y10T 156/1944
See application file for complete search history.

(56) References Cited

U.S. PATENT DOCUMENTS

| | | |
|---|---|---|
| 2012/0330453 A1 | 12/2012 | Samak et al. |
| 2015/0314584 A1 | 11/2015 | Dong et al. |
| 2019/0009513 A1 | 1/2019 | Filipovic et al. |
| 2020/0148491 A1 | 5/2020 | Lin et al. |
| 2020/0391497 A1 | 12/2020 | Yamasaki et al. |
| 2021/0245491 A1 | 8/2021 | Mciver et al. |

FOREIGN PATENT DOCUMENTS

| | | |
|---|---|---|
| GB | 2490152 A | 10/2012 |
| WO | 2007082238 A2 | 7/2007 |

OTHER PUBLICATIONS

Extended European Search Report, dated Jan. 14, 2025, regarding EP Application No. 24190527.2, 9 pages.
European Patent Office Action, dated Dec. 9, 2025, regarding EP Application No. 24190527.2, 9 pages.

*Primary Examiner* — Philip C Tucker
*Assistant Examiner* — Nickolas R Harm
(74) *Attorney, Agent, or Firm* — Yee & Associates, P.C.

(57)     ABSTRACT

A composite backing layer peel starter and methods of use are presented. A method of beginning removal of a backing layer from a composite material is presented. An impact force is applied to a corner of the backing layer with a polymeric material contact surface of a striker to adhere the polymeric material to the backing layer. The striker is pulled away from the backing layer to apply a lifting force to the backing layer.

24 Claims, 6 Drawing Sheets

700

702 — SPECIFICATION AND DESIGN

704 — MATERIAL PROCUREMENT

706 — COMPONENT AND SUBASSEMBLY MANUFACTURING

708 — SYSTEM INTEGRATION

710 — CERTIFICATION AND DELIVERY

712 — IN SERVICE

714 — MAINTENANCE AND SERVICE

COMPOSITE BACKING LAYER PEEL STARTER

BACKGROUND INFORMATION

1. Field

The present disclosure relates generally to composite manufacturing and more specifically to preparing a prepreg composite material.

2. Background

Composite materials are strong, light-weight materials created by combining two or more functional components. For example, a composite material may include reinforcing fibers bound in polymer resin matrix. The fibers can take the form of a unidirectional tape, woven cloth or fabric, or a braid. The mechanical properties and other material properties of composite materials can be desirable for some implementations.

Composite materials can be preimpregnated then stored in a roll or sheet with a backing layer. Prior to manufacturing a composite structure, the backing layer is removed. However, removal of the backing layer takes an undesirable amount of time and can result in undesirable effects on the composite material.

Therefore, it would be desirable to have a method and apparatus that takes into account at least some of the issues discussed above, as well as other possible issues.

SUMMARY

An embodiment of the present disclosure provides a method of beginning removal of a backing layer from a composite material. An impact force is applied to a corner of the backing layer with a polymeric material contact surface of a striker. The striker is pulled away from the backing layer to apply a lifting force to the backing layer.

Another embodiment of the present disclosure provides a composite backing layer peel starter. The composite backing layer peel starter comprises a rigid hammer and a striker connected to the rigid hammer, the striker comprising a polymeric material contact surface configured to adhere to a backing layer of a composite material.

Yet another embodiment of the present disclosure provides a method of beginning removal of a backing layer from a composite material. The composite material is brought to an ambient temperature. At least one of a downward force or a rotational force is applied to a corner of the backing layer with a polymeric material contact surface of a striker. The striker is pulled away from the backing layer to apply a lifting force to the backing layer.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more considerations. The illustrative examples recognize and take into account that a variety of methods may be used to remove a backing material from a composite material. The illustrative examples recognize and take into account that methods to remove a backing material may undesirably disturb the composite ply. The illustrative examples recognize and take into account that having a free edge of backing material aids in beginning removal of the backing material from a composite material for any removal method.

The illustrative examples present a composite backing layer peel starter. The composite backing layer peel starter may also be referred to as a "release initiator." The composite backing layer peel starter creates a free edge of backing material. Creating the free edge allows any form of automated backing removal to take place. The illustrative examples provide a composite backing layer peel starter comprising a rigid hammer and a striker connected to the rigid hammer, the striker comprising a polymeric material contact surface configured to adhere to a backing layer of a composite material.

Figure 1:
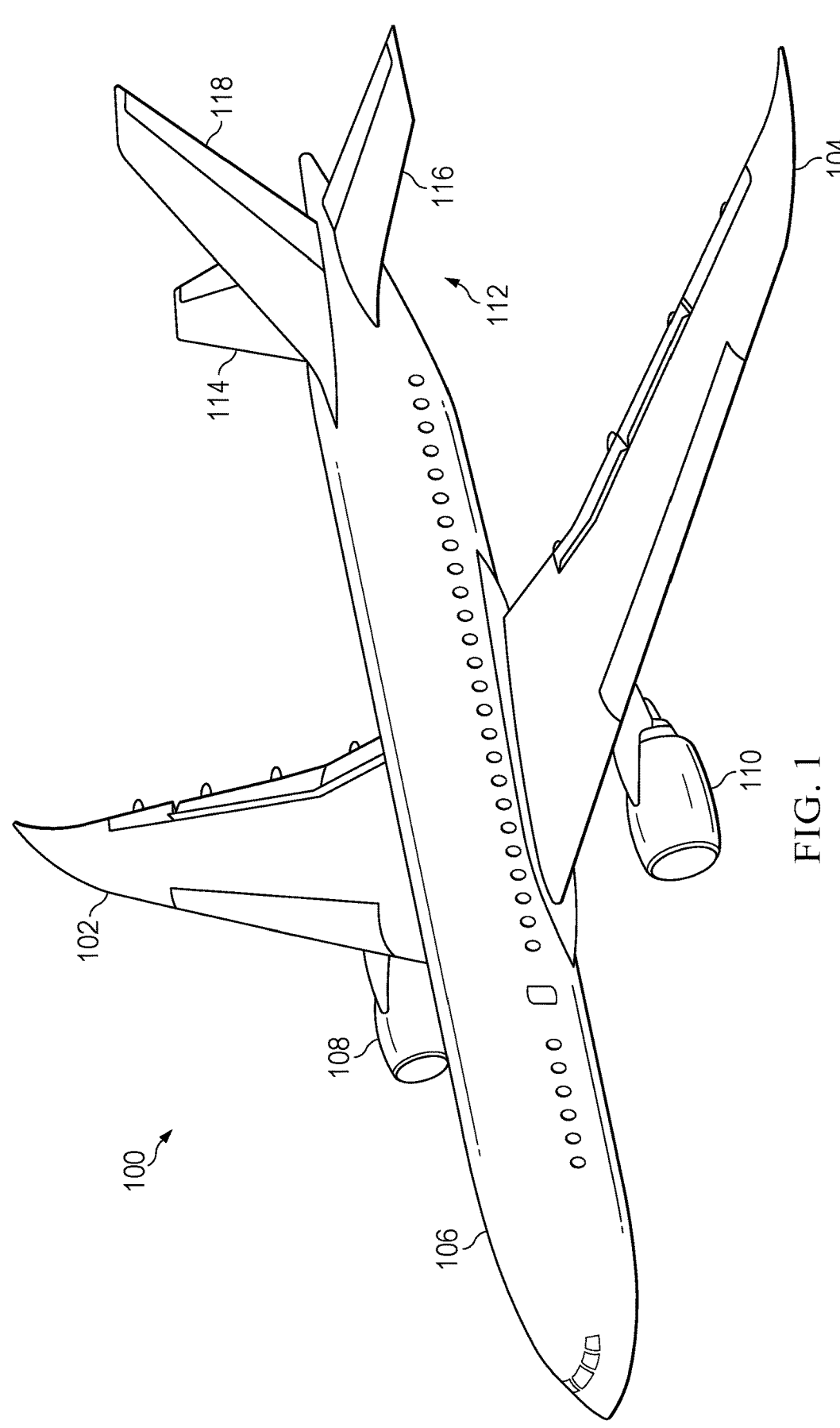
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have composite components formed using composite material after lifting a backing material using the illustrative examples. To manufacture a composite component, such as part of wing 102 or wing 104, a composite backing layer peel starter of the illustrative examples can be used to lift a corner of a backing material on a composite ply.

Figure 2:
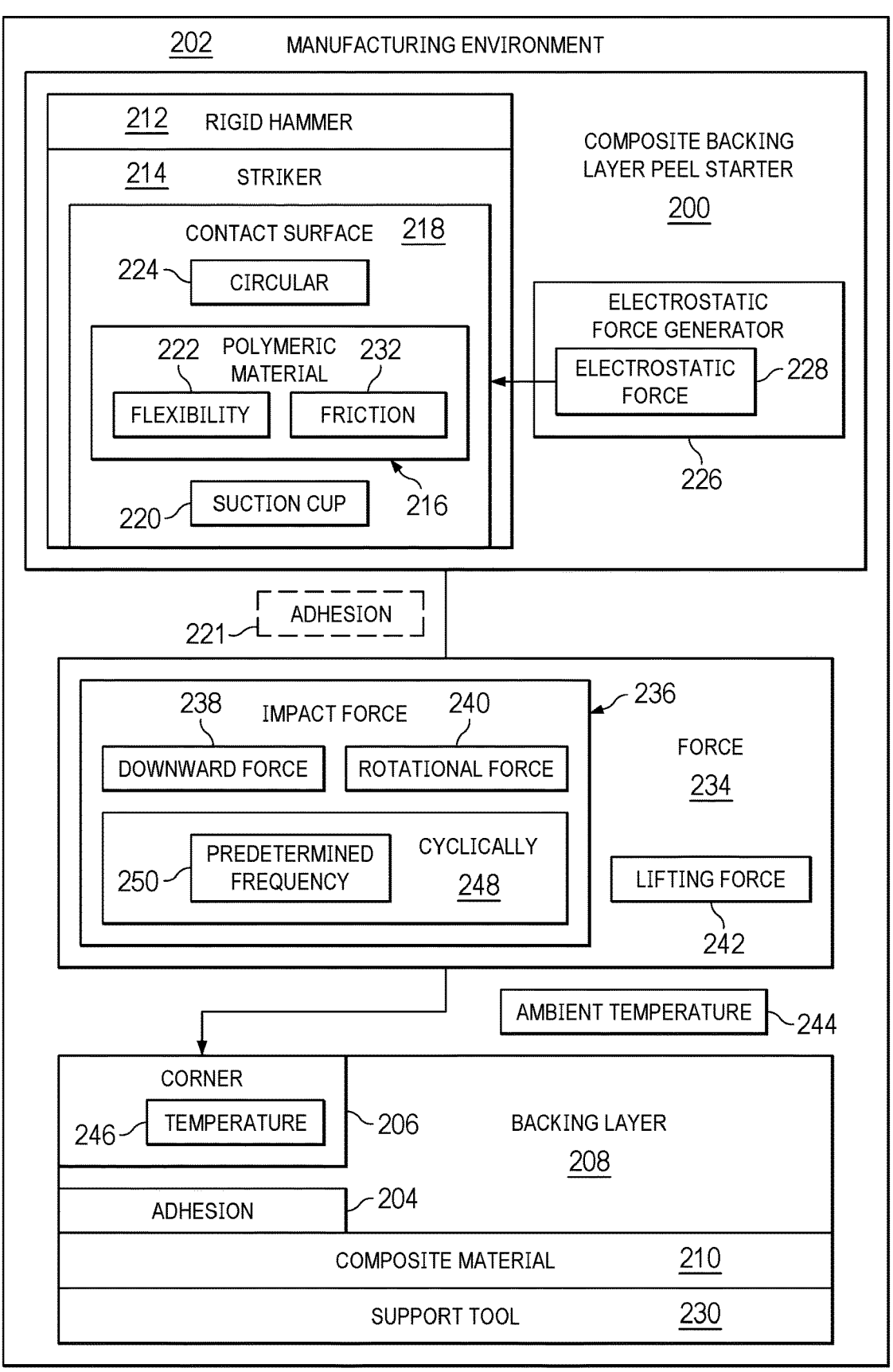
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Composite backing layer peel starter 200 is present in manufacturing environment 202. Composite backing layer peel starter 200 is configured to break adhesion 204 of corner 206 of backing layer 208 on composite material 210. Composite backing layer peel starter 200 is configured to locally break adhesion 204 of backing layer 208 from composite material 210.

Contact surface 218 comprises polymeric material 216 having flexibility 222 configured to preserve a thickness of composite material 210 in an area struck by contact surface 218.

Composite backing layer peel starter 200 comprises rigid hammer 212 and striker 214 connected to rigid hammer 212. Striker 214 comprises polymeric material 216 contact surface 218 configured to adhere to backing layer 208 of composite material 210. Adhesion 221 between contact surface 218 and backing layer 208 can be used to lift backing layer 208 and composite material 210.

In some illustrative examples, contact surface 218 comprises polymeric material 216 having flexibility 222 configured to create adhesion 221 between backing layer 208 and polymeric material 216.

Striker 214 applies force 234 to composite material 210 to break adhesion 204 between backing layer 208 and composite material 210. Striker 214 applies impact force 236 to break adhesion 204 through at least one of downward force 238 or rotational force 240. Rotational force 240 during impact can create shear to aid in breaking adhesion 204 between backing layer 208 and composite material 210. In some illustrative examples, polymeric material 216 generates sufficient friction 232 against backing layer 208 to break adhesion 204 with rotational force 240.

Striker 214 applies lifting force 242 to pull backing layer 208 away from composite material 210. Adhesion 221 between contact surface 218 and backing layer 208 further breaks adhesion 204 between backing layer 208 and composite material 210 as contact surface 218 is pulled away from composite material 210 by lifting force 242.

In some illustrative examples, contact surface 218 comprises suction cup 220. Suction cup 220 can generate greater adhesion 221 between contact surface 218 and backing layer 208. Suction cup 220 allows for contact surface 218 to better break adhesion 204 during lifting force 242.

In some illustrative examples, contact surface 218 is circular 224. In some illustrative examples, contact surface 218 is approximately 0.5 inch in diameter.

In some illustrative examples, composite backing layer peel starter 200 further comprises electrostatic force generator 226 configured to apply electrostatic force 228 to one of contact surface 218 or backing layer 208. Electrostatic force 228 can increase adhesion of polymeric material 216 of contact surface 218 to backing layer 208.

In some illustrative examples, composite material 210 is brought to an ambient temperature 244 prior to applying impact force 236. In some illustrative examples, temperature 246 of corner 206 of backing layer 208 is locally changed prior to applying impact force 236. Locally changing temperature 246 of corner 206 of backing layer 208 can include reducing temperature 246 of corner 206 of backing layer 208. In some illustrative examples, changing temperature 246 of corner 206 of backing layer 208 reduces adhesion 204 of backing layer 208 and composite material 210. In some illustrative examples, changing temperature 246 of corner 206 of backing layer 208 allows for adhesion 204 between backing layer 208 and composite material 210 to be more easily broken.

Composite material 210 is present on support tool 230 when composite backing layer peel starter 200 applies impact force 236. Support tool 230 can take any desirable form. In some illustrative examples, support tool 230 is a rigid tool, such as a cutting table. In some illustrative examples, composite material 210 is held against support tool 230 by vacuum.

The illustration of manufacturing environment 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, suction cup 220 is optional. In some illustrative examples, rotational force 240 is optional.

As another example, force 234 can be repeatedly applied. In some illustrative examples, impact force 236 of contact surface 218 against backing layer 208 is cyclically 248 applied at predetermined frequency 250. Predetermined frequency 250 is configured to break adhesion 204 between backing layer 208 and composite material 210. In some illustrative examples, polymeric material 216 contact surface 218 of striker 214 cyclically 248 applies impact force 236 to corner 206 of backing layer 208 at predetermined frequency 250 configured to break adhesion 204.

As yet another example, a coating can be applied to contact surface 218 to increase adhesion 221. In some illustrative examples, an adhesive or other coating can be added to contact surface 218. In some illustrative examples, a coating may increase manufacturing time by having at least one of additional coating application, cleaning, removal, or reapplication steps.

Figure 3:
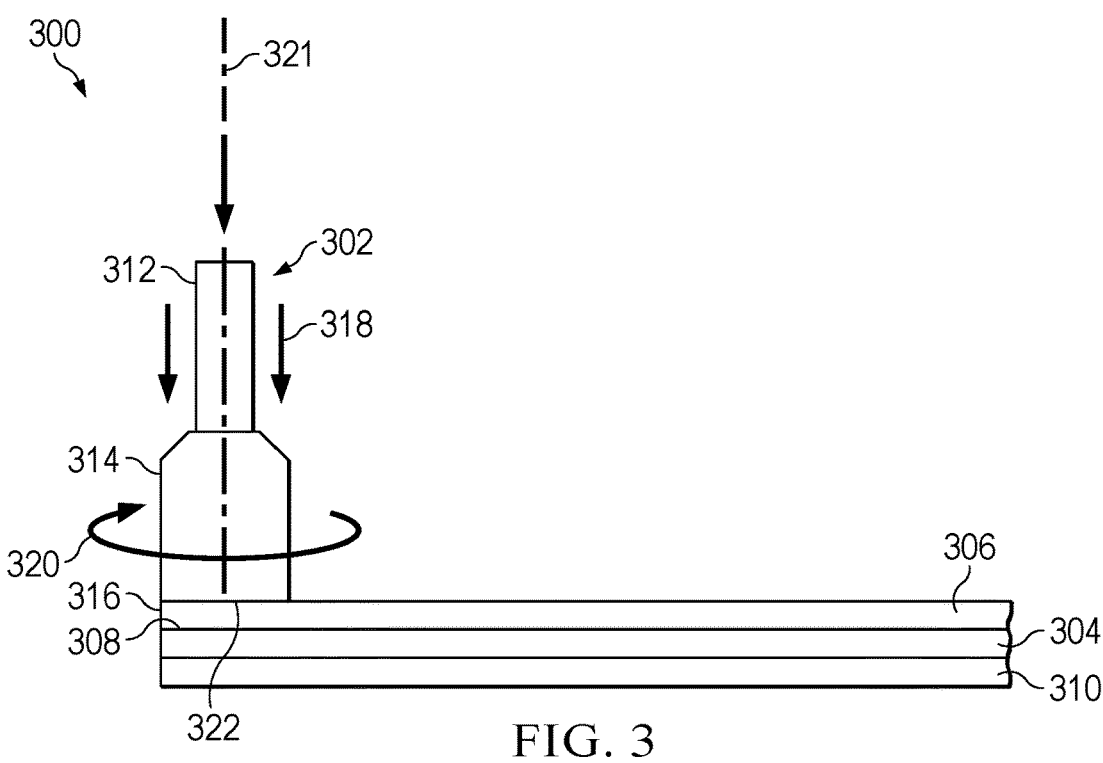
FIG. 3 is an illustration of a composite backing layer peel starter moving relative to a composite material in accordance with an illustrative embodiment.

Turning now to FIG. 3, an illustration of a composite backing layer peel starter moving relative to a composite material is depicted in accordance with an illustrative embodiment. In view 300 composite backing layer peel starter 302 is acting upon composite material 304 to locally break adhesion 308 between backing layer 306 and composite material 304.

Composite backing layer peel starter 302 is a physical implementation of composite backing layer peel starter 200 of FIG. 2. Composite backing layer peel starter 302 comprises rigid hammer 312 and striker 314 connected to rigid hammer 312. Striker 314 comprises a polymeric material contact surface configured to adhere to backing layer 306 of composite material 304.

In some illustrative examples, contact surface 322 comprises a polymeric material having a flexibility configured to cause adhesion between the backing layer 306 and the polymeric material. In some illustrative examples, contact surface 322 is approximately 0.5 inch in diameter. In some illustrative examples, contact surface 322 is circular.

The polymeric material has a flexibility configured to preserve a thickness of composite material 304 in an area struck by contact surface 322.

In view 300, contact surface 322 of striker 314 applies an impact force to corner 316 of backing layer 306. In view 300, the impact force comprises downward force 318 sufficient to create an adhesion between the polymeric material of striker 314 and backing layer 306.

As depicted, the impact force further comprises rotational force 320. Rotational force 320 is a force of rotating striker 314 about rotational axis 321. Rotational axis 321 extends parallel to rigid hammer 312. Rotational force 320 is applied to locally break adhesion 308 between backing layer 306 and composite material 304. In some illustrative examples, rotational force 320 is optional. In some illustrative examples, rotational force 320 is applied while contact surface 322 is in contact with backing layer 306. In some illustrative examples, rotational force 320 is applied while downward force 318 is applied to composite material 304. Rotational force 320 may be referred to as twisting. Rotational force 320 during the impact can create shear to aid in breaking adhesion 308 between backing layer 306 and composite material 304 to break backing layer 306 loose.

Composite material 304 is present on support tool 310 when composite backing layer peel starter 302 applies the impact force. Support tool 310 can take any desirable form. In some illustrative examples, support tool 310 is a rigid tool, such as a cutting table. In some illustrative examples, composite material 304 is held against support tool 310 by vacuum.

Figure 4:
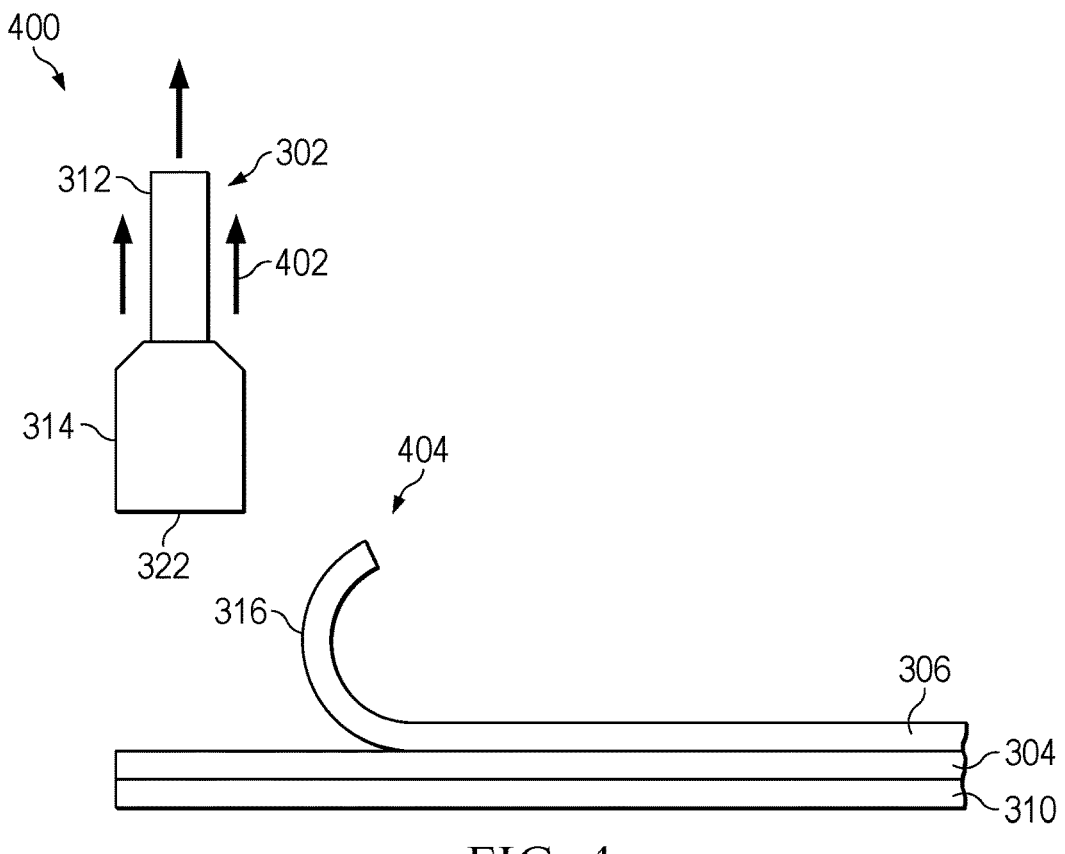
FIG. 4 is an illustration of a composite backing layer peel starter moving relative to a composite material in accordance with an illustrative embodiment.

Turning now to FIG. 4, an illustration of a composite backing layer peel starter moving relative to a composite material is depicted in accordance with an illustrative embodiment. In view 400, composite backing layer peel starter 302 is pulling striker 314 away from backing layer 306 to apply lifting force 402 to backing layer 306.

In view 400, lifting force 402 has lifted corner 316 to form lifted corner 404. Lifting force 402 pulls corner 316 of backing layer 306 away from composite material 304. Lifting force 402 breaks any adhesion between contact surface 322 and backing layer 306.

Figure 5:
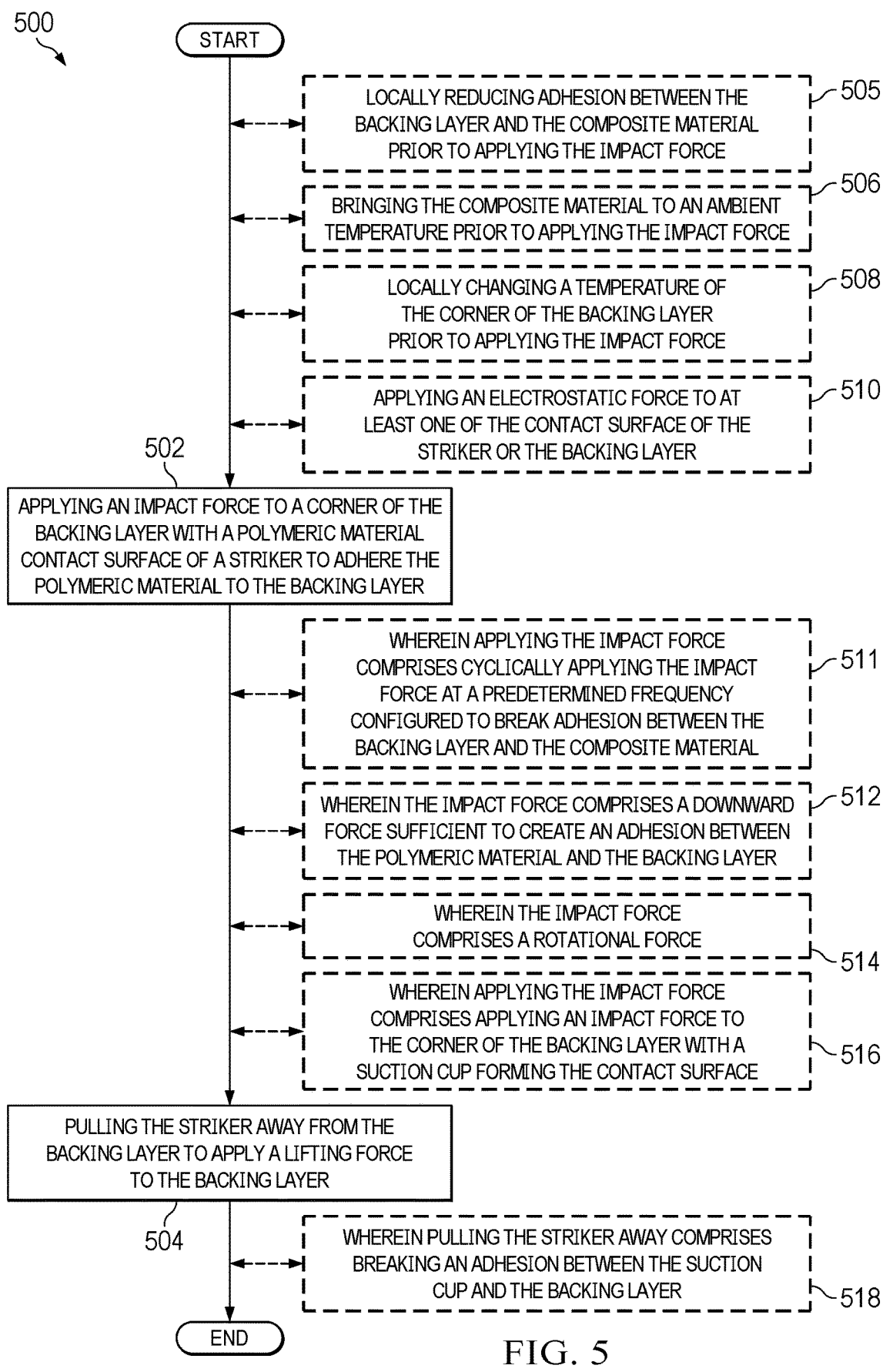
FIG. 5 is a flowchart of a method of beginning removal of a backing layer from a composite material in accordance with an illustrative embodiment.

Turning now to FIG. 5, a flowchart of a method of beginning removal of a backing layer from a composite material is depicted in accordance with an illustrative embodiment. Method 500 can be implemented in composite manufacturing for components in aircraft 100 of FIG. 1. Method 500 can be performed using composite backing layer peel starter 200 of FIG. 2. Method 500 can be performed by composite backing layer peel starter 302 of FIGS. 3 and 4.

Method 500 applies an impact force to a corner of the backing layer with a polymeric material contact surface of a striker to adhere the polymeric material to the backing layer (operation 502). Method 500 pulls the striker away from the backing layer to apply a lifting force to the backing layer (operation 504). Afterwards, method 500 terminates.

In some illustrative examples, method 500 locally reduces adhesion between the backing layer and the composite material prior to applying the impact force (operation 505). In some illustrative examples, method 500 brings the composite material to an ambient temperature prior to applying the impact force (operation 506). In some illustrative examples, method 500 locally changes a temperature of the corner of the backing layer prior to applying the impact force (operation 508). Locally changing the temperature of the corner of the backing layer can include reducing the temperature of the corner of the backing layer. In some illustrative examples, changing the temperature of the corner of the backing layer reduces the adhesion of the backing layer and the composite material. In some illustrative examples, changing the temperature of the corner of the backing layer allows for the adhesion between the backing layer and the composite material to be more easily broken.

In some illustrative examples, method 500 applies an electrostatic force to at least one of the contact surface of the striker or the backing layer (operation 510). In these illustrative examples, the electrostatic force can increase an adhesion between the contact surface and the backing layer. Increasing the adhesion between the contact surface and the backing layer increases the force applied to the backing layer when the contact surface is lifted away from the backing layer.

In some illustrative examples, applying the impact force comprises cyclically applying the impact force at a predetermined frequency configured to break adhesion between the backing layer and the composite material (operation 511). In some illustrative examples, the impact force comprises a downward force sufficient to create an adhesion between the polymeric material and the backing layer (operation 512). In some illustrative examples, the impact force comprises a rotational force (operation 514). In some illustrative examples, applying the impact force comprises applying an impact force to the corner of the backing layer with a suction cup forming the contact surface, and wherein pulling the striker away comprises breaking an adhesion between the suction cup and the backing layer (operation 516).

Figure 6:
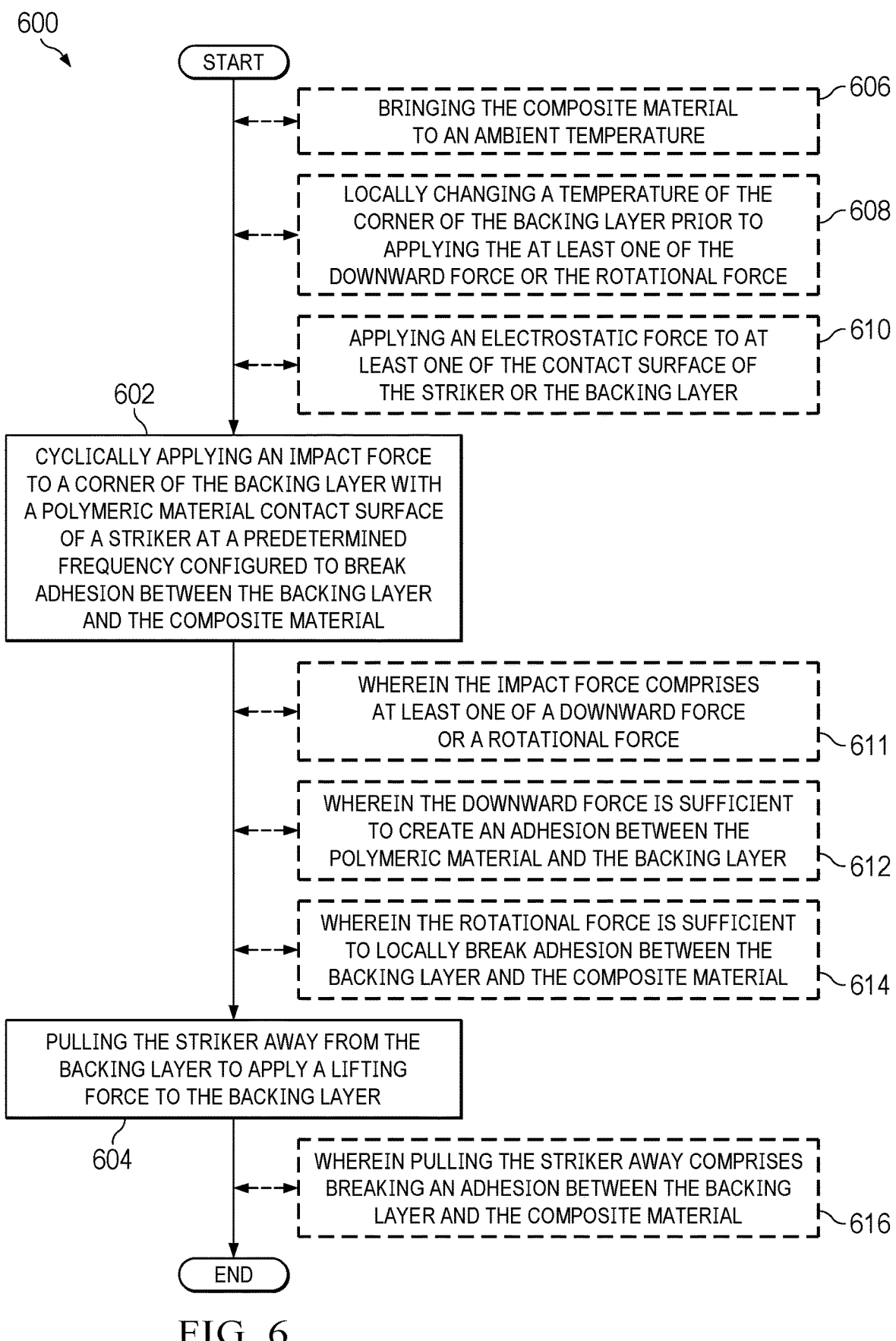
FIG. 6 is a flowchart of a method of beginning removal of a backing layer from a composite material in accordance with an illustrative embodiment.

Turning now to FIG. 6, a flowchart of a method of beginning removal of a backing layer from a composite material is depicted in accordance with an illustrative embodiment. Method 600 can be implemented in composite manufacturing for components in aircraft 100 of FIG. 1. Method 600 can be performed using composite backing layer peel starter 200 of FIG. 2. Method 600 can be performed by composite backing layer peel starter 302 of FIGS. 3 and 4.

Method 600 cyclically applies an impact force to a corner of the backing layer with a polymeric material contact surface of a striker at a predetermined frequency configured to break adhesion between the backing layer and the composite material (operation 602). Method 600 pulls the striker away from the backing layer to apply a lifting force to the backing layer (operation 604). Afterwards, method 600 terminates.

In some illustrative examples, method 600 brings the composite material to an ambient temperature (operation 606). In some illustrative examples, method 600 locally changes a temperature of the corner of the backing layer prior to applying the at least one of the downward force or the rotational force (operation 608). Locally changing the temperature of the corner of the backing layer can include reducing the temperature of the corner of the backing layer. In some illustrative examples, changing the temperature of the corner of the backing layer reduces the adhesion of the backing layer and the composite material. In some illustrative examples, changing the temperature of the corner of the backing layer allows for the adhesion between the backing layer and the composite material to be more easily broken.

In some illustrative examples, method 600 applies an electrostatic force to at least one of the contact surface of the striker or the backing layer (operation 610). In these illustrative examples, the electrostatic force can increase an adhesion between the contact surface and the backing layer. Increasing the adhesion between the contact surface and the backing layer increases the force applied to the backing layer when the contact surface is lifted away from the backing layer.

In some illustrative examples, the impact force comprises at least one of a downward force or a rotational force (operation 611). In some illustrative examples, the downward force is sufficient to create an adhesion between the polymeric material and the backing layer (operation 612). In some illustrative examples, the rotational force is sufficient to locally break adhesion between the backing layer and the composite material (operation 614). In some illustrative examples, pulling the striker away comprises breaking an adhesion between the backing layer and the composite material (operation 616).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination of items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 506 through operation 518 may be optional. For example, operation 608 through operation 616 may be optional.

Figure 7:
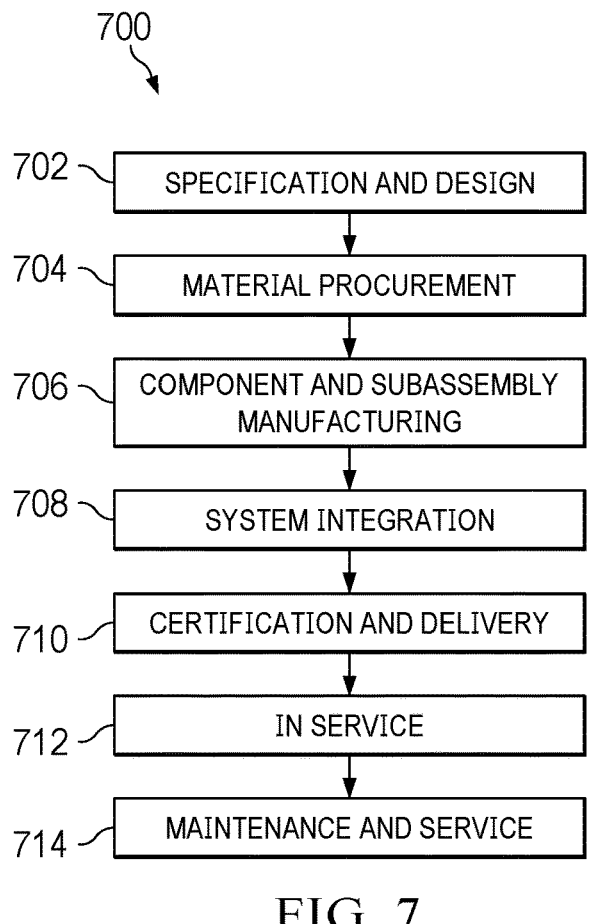
FIG. 7 is an illustration of an aircraft manufacturing and service method in a form of a block diagram in accordance with an illustrative embodiment.
Figure 8:
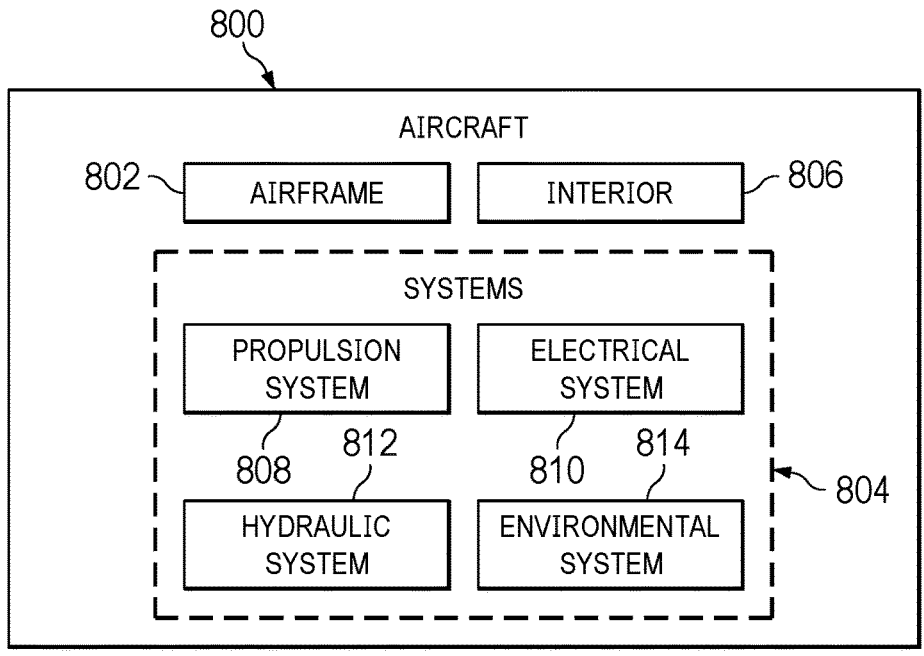
FIG. 8 is an illustration of an aircraft in a form of a block diagram in which an illustrative embodiment may be implemented.

Illustrative embodiments of the present disclosure may be described in the context of aircraft manufacturing and service method 700 as shown in FIG. 7 and aircraft 800 as shown in FIG. 8. Turning first to FIG. 7, an illustration of an aircraft manufacturing and service method in a form of a block diagram is depicted in accordance with an illustrative embodiment. During pre-production, aircraft manufacturing and service method 700 may include specification and design 702 of aircraft 800 in FIG. 8 and material procurement 704.

During production, component and subassembly manufacturing 706 and system integration 708 of aircraft 800 takes place. Thereafter, aircraft 800 may go through certification and delivery 710 in order to be placed in service 712. While in service 712 by a customer, aircraft 800 is scheduled for routine maintenance and service 714, which may include modification, reconfiguration, refurbishment, or other maintenance and service.

Each of the processes of aircraft manufacturing and service method 700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 8, an illustration of an aircraft in a form of a block diagram is depicted in which an illustrative embodiment may be implemented. In this example, aircraft 800 is produced by aircraft manufacturing and service method 700 of FIG. 7 and may include airframe 802 with plurality of systems 804 and interior 806. Examples of systems 804 include one or more of propulsion system 808, electrical system 810, hydraulic system 812, and environmental system 814. Any number of other systems may be included.

Apparatuses and methods embodied herein may be employed during at least one of the stages of aircraft manufacturing and service method 700. One or more illustrative embodiments may be manufactured or used during at least one of component and subassembly manufacturing 706, system integration 708, in service 712, or maintenance and service 714 of FIG. 7.

The illustrative examples present a composite backing layer peel starter. The composite backing layer peel starter can be referred to as an initiator. The composite backing layer peel starter comprises a small hammer that strikes the composite material quickly. In some illustrative examples, the quick striking comprises rotating. The striking breaks the adhesive bond between the backing material and the composite ply.

The illustrative examples present a very fast and compact device. The illustrative examples do not require leverage to use. Striking the backing material to break the adhesive bond between the backing material and composite ply can include a twist during the strike. Twisting during the impact can create shear to aid in breaking the backing material loose. You could use a suction cup to increase the adhesive between the striker and the backing material. In some illustrative examples, an adhesive or other surface coating can be applied to the contact surface to increase the adhesion.

The illustrative examples can be used in conjunction with any pick and place technology for composite prepreg. The illustrative examples create a free edge of backing material using a soft rubber striker to locally break tack adhesion from the composite material. In some illustrative examples, the rubber striker can be used as part of a pick and place system. In some illustrative examples, the rubber striker can be used separately from a pick and place system or other backing remover.

In the illustrative examples, an impact is used to break adhesion between the backing material and the composite material. In some illustrative examples, the impact and an optional twisting motion are used to break adhesion. In some illustrative examples, the impact and an adhesion between the contact surface and the backing material are used to break adhesion. In some illustrative examples, an impact and then a suction cup adhesion of the hammer to the backing material can be used to break adhesion. In these illustrative examples, the optional suction device can increase adhesion to the backing material. In some illustrative examples, a cyclic impact of the hammer at a predetermined frequency is used to break adhesion. The hammering could be cycled at a predetermined frequency to break the adhesion.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of beginning removal of a backing layer from a composite material, the method comprising:

separating a corner of the backing layer away from the composite material by impacting, cyclically along a rotational axis of a first cylindrical rod, a polymeric material forming a contact surface of a striker connected to an end of the first cylindrical rod into the backing layer at a frequency breaking an adhesion between the backing layer and the composite material, wherein the first cylindrical rod is:

rigid and applies a force along the rotational axis at a frequency breaking an adhesion between a backing layer and a composite material; and is connected to a second cylindrical rod that is rigid and comprises a diameter, greater than a diameter of the first cylindrical rod, that tapers to connect with the first cylindrical rod, wherein the second cylindrical rod comprises a contact surface, on an end of the second cylindrical rod opposite a tapered end connected to the first cylindrical rod, that comprises a polymeric material that comprises a flexibility and an adhesive property; and applying, from the second cylindrical rod, a lifting force pulling the backing layer away from the composite material.

2. The method of claim 1, wherein the impacting comprises a downward force creating an adhesion between the polymeric material and the backing layer.

3. The method of claim 1, wherein the impacting comprises a rotational force.

4. The method of claim 1, wherein the impacting comprises applying an impact force to the corner of the backing layer with a suction cup forming the contact surface, and wherein the striker is pulled away to break an adhesion between the suction cup and the backing layer.

5. The method of claim 1, further comprising bringing the composite material to an ambient temperature prior to the impacting.

6. The method of claim 5, further comprising locally reducing adhesion between the backing layer and the composite material prior to the impacting.

7. The method of claim 5, further comprising locally changing a temperature of the corner of the backing layer prior to the impacting.

8. The method of claim 1, further comprising:

applying an electrostatic force to at least one of the contact surface of the striker or the backing layer.

9. The method of claim 1, wherein impacting comprises a predetermined frequency breaking adhesion between the backing layer and the composite material.

10. A composite backing layer peel starter that comprises:

a first cylindrical rod that is rigid and comprises a rotational axis, wherein the first cylindrical rod is configured to cyclically apply a force along the rotational axis at a frequency that breaks an adhesion between a backing layer and a composite material; and a second cylindrical rod that is rigid and comprises a diameter, greater than a diameter of the first cylindrical rod, that tapers to connect with the first cylindrical rod, wherein the second cylindrical rod comprises a contact surface, on an end of the second cylindrical rod opposite a tapered end connected to the first cylindrical rod, that comprises a polymeric material that comprises a flexibility and an adhesive property.

11. The composite backing layer peel starter of claim 10, wherein:

the first cylindrical rod is further configured to rotate around the rotational axis; and the contact surface comprises a suction cup.

12. The composite backing layer peel starter of claim 10, wherein the flexibility of the polymeric material is configured to create an adhesion between the backing layer and the polymeric material.

13. The composite backing layer peel starter of claim 10, wherein the contact surface is approximately 0.5 inches in diameter.

14. The composite backing layer peel starter of claim 10, wherein the contact surface is circular.

15. The composite backing layer peel starter of claim 10, further comprising:

an electrostatic force generator configured to apply an electrostatic force to the contact surface.

16. The composite backing layer peel starter of claim 10, wherein the contact surface is further configured to apply a rotational force about the rotational axis.

17. A method of beginning removal of a backing layer from a composite material, the method comprising:

cyclically applying an impact force, to a corner of the backing layer cyclically along a rotational axis of a first cylindrical rod connected to a second cylindrical rod comprising a contact surface comprising polymeric material, at a predetermined frequency and thereby breaking adhesion between the backing layer and the composite material, wherein the second cylindrical rod comprises a diameter, greater than a diameter of the first cylindrical rod, that tapers to connect with the first cylindrical rod, wherein the second cylindrical rod comprises the contact surface on an end of the second cylindrical rod opposite a tapered end connected to the first cylindrical rod and the polymeric material comprises a flexibility and an adhesive property; and applying a lifting force away from the composite material to the backing layer by pulling the contact surface away, along the rotational axis, from the backing layer.

18. The method of claim 17, wherein the impact force comprises at least one of a downward force or a rotational force.

19. The method of claim 18, wherein the downward force is sufficient to create an adhesion between the polymeric material and the backing layer.

20. The method of claim 18, wherein the rotational force is sufficient to locally break adhesion between the backing layer and the composite material.

21. The method of claim 18, further comprising:

locally changing a temperature of the corner of the backing layer prior to applying the at least one of the downward force or the rotational force.

22. The method of claim 17, wherein pulling the contact surface away comprises breaking an adhesion between the backing layer and the composite material.

23. The method of claim 17, further comprising:
applying an electrostatic force to at least one of the contact surface of the second cylindrical rod or the backing layer.

24. The method of claim 17, further comprising:
bringing the composite material to an ambient temperature.

\* \* \* \* \*